United States Patent
Lee

(10) Patent No.: US 7,206,874 B2
(45) Date of Patent: Apr. 17, 2007

(54) STATUS DISPLAY-ENABLED CONNECTOR FOR A UNIVERSAL ASYNCHRONOUS RECEIVER/TRANSMITTER

(75) Inventor: Chun-Liang Lee, Taipei (TW)

(73) Assignee: Inventec Corporation, Taipei (TW)

( * ) Notice: Subject to any disclaimer, the term of this patent is extended or adjusted under 35 U.S.C. 154(b) by 530 days.

(21) Appl. No.: 10/764,515

(22) Filed: Jan. 27, 2004

(65) Prior Publication Data

US 2005/0176311 A1    Aug. 11, 2005

(51) Int. Cl.
- G06F 13/12  (2006.01)
- G06F 13/00  (2006.01)
- G06F 13/14  (2006.01)
- G06F 13/36  (2006.01)

(52) U.S. Cl. .................. 710/62; 710/100; 710/305; 710/315

(58) Field of Classification Search .............. None
See application file for complete search history.

(56) References Cited

U.S. PATENT DOCUMENTS

| 6,266,721 | B1 * | 7/2001 | Sheikh et al. ............... 710/100 |
| 2002/0026532 | A1 * | 2/2002 | Maeda et al. ............... 709/250 |
| 2002/0049877 | A1 * | 4/2002 | Lin ........................... 710/305 |

OTHER PUBLICATIONS

Serial and Parallel cable schematics and wiring diagrams, http://www.jspayne.com/io/schematics.html , Copyright 1998.*

* cited by examiner

*Primary Examiner*—Donald Sparks
*Assistant Examiner*—David Martinez
(74) *Attorney, Agent, or Firm*—Rabin & Berdo, P.C.

(57) ABSTRACT

A Universal Asynchronous Receiver/Transmitter (UART) connector capable of displaying status includes a capturing unit, a driving unit and a display unit. The UART connector captures asynchronous transmitting input and output signals, and are displayed by driving the display unit so that users can understand current UART input and output status to facilitate error detection and trouble shooting when malfunctions occur.

1 Claim, 3 Drawing Sheets

| Pin NO. | Abbreviation | Description |
|---------|--------------|-------------|
| Pin 1 | DCD | (Data Carrier Detect) |
| Pin 2 | RXD | (Received Data) |
| Pin 3 | TXD | (Transmit Data) |
| Pin 4 | DTR | (Data Terminal Ready) |
| Pin 5 | GND | (Ground) |
| Pin 6 | DSR | (Data set Ready) |
| Pin 7 | RTS | (Request To Send) |
| Pin 8 | CTS | (Clear To Send) |
| Pin 9 | RI | (Ring Indicator) |

US 7,206,874 B2

STATUS DISPLAY-ENABLED CONNECTOR FOR A UNIVERSAL ASYNCHRONOUS RECEIVER/TRANSMITTER

FIELD OF THE INVENTION

The present invention relates to a connector for a universal asynchronous receiver/transmitter (UART) and particularly to a connector capable of displaying the status of Ethernet port RJ-45 and serial transmission port of 9-pin.

BACKGROUND OF THE INVENTION

Transmitting data between two sets of information processing equipment usually is accomplished through a communication protocol. UART is a commonly used communication protocol. In the event that the two sets of information processing equipment have different serial transmission communication interfaces, line connection and data transmission between these two information processing equipments have to resort an interface transformation function provided by the interface receiver/transmitter.

The receiver/transmitter has many combinations depending on the interfaces. The receiver/transmitter for the Ethernet port RJ-45 and serial transmission port RS-232 is frequently used. At present this type of receiver/transmitter does not have a status display function. When error or malfunction occurs, users do not know whether the UART functions normally. Hence users have to check individually to find the problem or causes of malfunction. This is time-consuming and not desirable nowadays.

SUMMARY OF THE INVENTION

In view of the foregoing problems the primary object of the invention is to provide a UART connector that has a status display function. It provides the transmission status of UART through an electronic logic circuit to enable users to have a clear understanding of the current data transmission condition.

In order to achieve the object set forth above, the UART connector according to the invention includes a capturing unit, a driving unit and a display unit. The pin signals of RXD, RTS, CTS, DTR and DSR of the asynchronous serial transmission are captured to enable the driving unit to drive the display unit that is capable of displaying status, so that users can see the display unit to understand whether the operating condition of the current asynchronous serial transmission is normal. In the event that errors or malfunctions occur, error detection and trouble shooting can be executed rapidly to save error detection time and improve data transmission quality.

The foregoing, as well as additional objects, features and advantages of the invention will be more readily apparent from the following detailed description, which proceeds with reference to the accompanying drawings.

BRIEF DESCRIPTION OF THE DRAWINGS

The invention will become more fully understood from the detailed description given hereinbelow illustration only, and thus are not limitative of the present invention, and wherein.

DESCRIPTION OF THE PREFERRED EMBODIMENT

Figure 1:
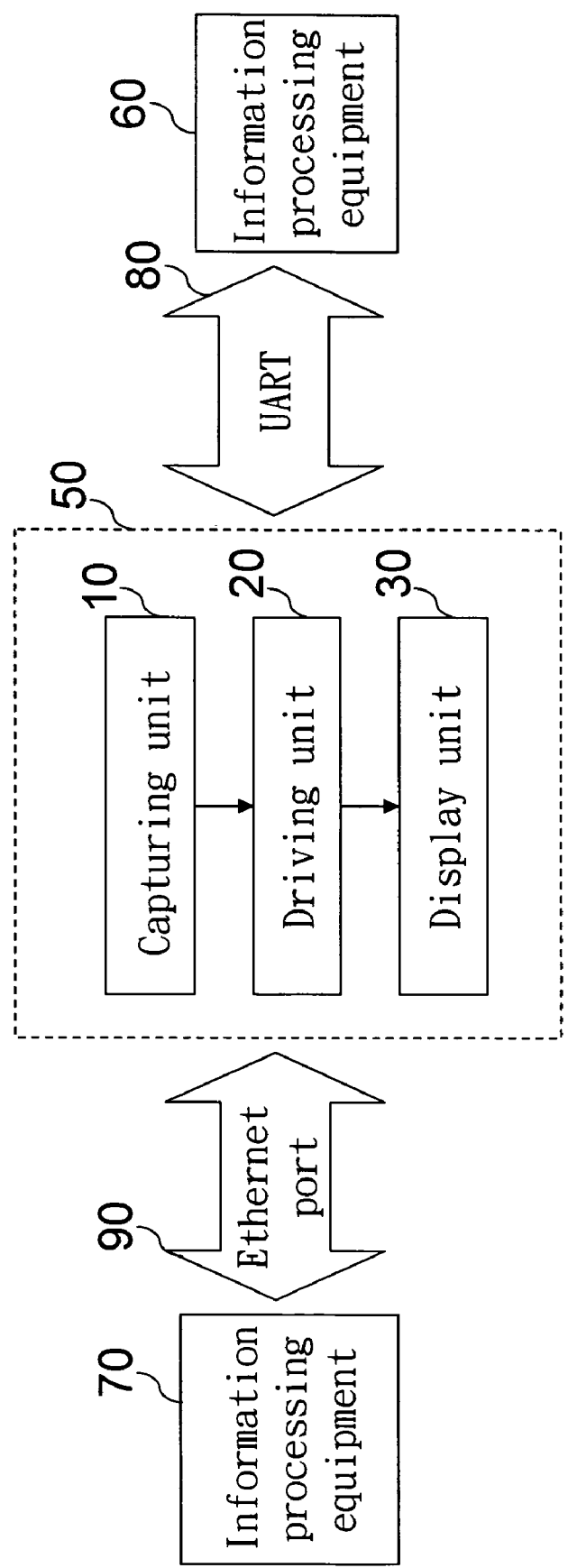
FIG. 1 is a functional block diagram of the invention.

Refer to FIG. 1 for the functional block diagram of the invention. It includes a first information processing equipment 60 to perform data transmission and receive operations with a second information processing equipment 70, which has an Ethernet port connector 90 (such as RJ-45) through a UART 80 and a status display-enabled connector 50.

The invention achieves a status display function by capturing pin signals of the UART 80 on the transceiver and through an electronic logic switch circuit. It includes:

A capturing unit 10, a driving unit 20 and a display unit 30. First, the interface specification of the UART 80 is transformed through an interface transceiver unit, then the capturing unit captures input and output signals of the UART 80, and outputs the signals to the driving unit 20. The driving unit 20 triggers the switch according to the input signals to drive the display unit 30 to display current operation conditions of the UART 80.

Figure 2:
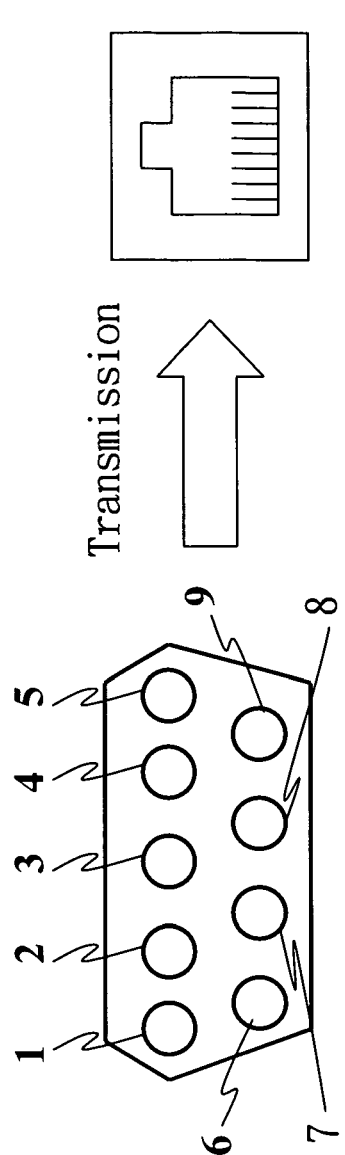
FIG. 2 is a chart showing pin description according to an embodiment of the prior art.

Refer to FIG. 2 for a serial transmission interface RS-232 of the UART as an example, for more details. The serial transmission interface RS-232 has a male connector with the pins as follows:

Pin 1 DCD (Data Carrier Detect), detect carrier wave.
Pin 2 RXD (Received Data), data input end.
Pin 3 TXD (Transmit Data), data output end.
Pin 4 DTR (Data Terminal Ready), receiving end ready.
Pin 5 GND (Ground), ground line.
Pin 6 DSR (Data Set Ready), transmission end ready.
Pin 7 RTS (Request to Send), request the other end to send data.
Pin 8 CTS (Clear to Send), clear to send data.
Pin 9 RI (Ring Indicator), ringing to detect.

The pins of the serial transmission interface RS-232 are connected to a corresponding circuit of the Ethernet port connector RJ-45. The capturing unit captures UART signals through the driving unit and display unit, to display the current operation status to users.

As the serial transmission interface RS-232 has 9 pins but the Ethernet interface RJ-45 has only 8 pins, for the receiver/transmitter of the invention the last pin RI is not connected (null), to connect the serial transmission interface RS-232 to the Ethernet connector RJ-45.

Figure 3:
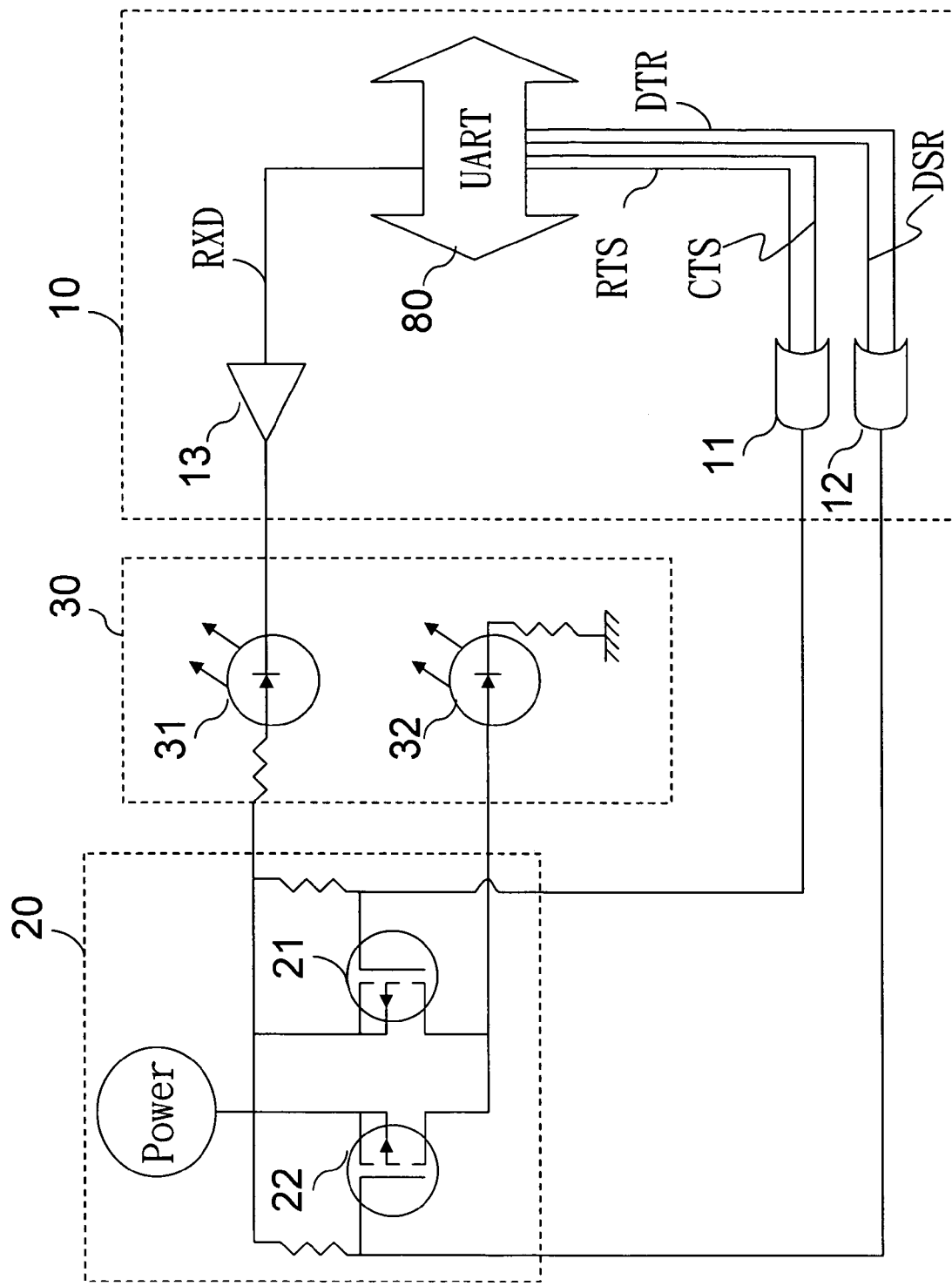
FIG. 3 is a circuit diagram of the invention.

Refer to FIG. 3 for the circuit diagram of the invention. The invention captures the pins RXD, RTS, CTS, DTR and DSR to receive data and indicate line connection status.

The capturing unit 10 includes a buffer switch 13, a first OR gate switch 11 and a second OR gate switch 12. The driving unit 20 consists of a first metal-oxide semiconductor (MOS) switch 21 and a second MOS switch 22. The display unit 30 includes a first light-emitting diode (LED) 31 and a second LED 32.

First, the RXD pin of the UART 80 and the first LED 31 are bridged by the buffer switch 13. The RXD signal is connected to the input end of the buffer switch 13, and the N pole of the first LED 31 is connected to the output end of the buffer switch 13. When the allocated RXD generates a low voltage signal, the input signal is output through the buffer switch 13 to generate a low voltage signal output to form a circuit. Power supply runs through the first LED 31, which becomes conductive and lighted, to indicate the UART is in a data receiving status.

In the following conditions, the second LED 32 that represents line connection is lighted. When the captured RTS output and CTS input are a low voltage signal, through the first OR gate switch 11, and according to OR logic calculation based on the input signal, the resulting output is a low voltage signal, the gate electrode of the first MOS switch 21 receives a trigger signal and the first MOS switch 21 is ON, power supply runs though the circuit of the first MOS switch 21 and drives the second LED 32, that represents the line connection condition to become conductive and lighted to indicate that line connection is established.

When the captured RTS input and CTS output are a high voltage signal, through the first OR gate switch 11. According to OR logic calculation based on the input signal, the resulting output is a high voltage signal, and the gate electrode of the first MOS switch 21 does not have a trigger signal. Hence the first MOS switch 21 is OFF. Power supply cannot run through the circuit. The second LED 32 that represents the line connection condition is not lighted, to indicate that line connection is not established.

Similarly, the captured DTR and DSR signals are processed in the same fashion. In the following conditions, the second LED 32 that represents the line connection condition is conductive and lighted. When the captured DTR output and DSR input are a low voltage signal, and according to OR logic calculation based on the input signal, the resulting output is a low voltage signal. The gate electrode of the second MOS switch 22 receives a trigger signal and becomes conductive, power supply runs though the circuit of the second MOS switch 22 and drives the second LED 32 that represents the line connection condition, to become conductive and lighted, to indicate that line connection is established.

When the captured DTR input and DSR output are a high voltage signal, through the second OR gate switch 12, and according to OR logic calculation based on the input signal, the resulting output is a high voltage signal. The gate electrode of the second MOS switch 22 does not have trigger signal. Hence the second MOS switch 22 is OFF. Power supply cannot run through the circuit of the second MOS switch 22. The second LED 32 that represents the line connection condition is not lighted, to indicate that line connection is not established.

Using the UART connector capable of the displaying status, users can have a clear understanding of the current UART operation status. When the UART input or output has malfunctions or errors, through the UART connector of the invention that can indicate the status, error detection and trouble shooting can be executed rapidly to maintain data transmission quality and accuracy.

While the preferred embodiments of the invention have been set forth for the purpose of disclosure, modifications of the disclosed embodiments of the invention as well as other embodiments thereof may occur to those skilled in the art. Accordingly, the appended claims are intended to cover all embodiments, which do not depart from the spirit and scope of the invention.

What is claimed is:

1. A converter having a status indicator, the converter converting an RS232 connector to an RJ45 connector, the RS232 connector having signals of RXD (received data), CTS (clear to send), DSR (data set ready), RTS (request to send), and DTR (data terminal ready), The RJ45 converter comprising:
   a capturing unit, having a buffer switch, a first OR gate switch and a second OR gate switch;
   a display unit, having
      a first light-emitting diode (LED), the first LED lighting when the N pole of the first LED receives a low voltage signal; and
      a second, LED, the second LED lighting when the P pole of the second LED receives a high voltage signal; and a driving unit, having
      a first metal-oxide semiconductor (MOS) switch, wherein when the gate electrode of the first MOS switch receives a high voltage signal, the first MOS switch outputs a high voltage signal to the P pole of the second LED; and
      a second MOS switch, wherein when the gate electrode of the second MOS switch receives a high voltage signal, the second MOS switch outputs a high voltage signal to the P pole of the second LED;
   wherein the buffer switch buffers the RXD signal to the N pole of the first LED, the first OR gate processes the RTS signal and the CTS signal to output to the gate electrode of the first MOS switch, and the second OR gate processes the DSR signal and the DTR signal to output to the gate electrode of the second MOS switch.

* * * * *